US006939074B2

(12) United States Patent
Gethmann

(10) Patent No.: US 6,939,074 B2
(45) Date of Patent: Sep. 6, 2005

(54) STEM CONNECTOR ASSEMBLY

(75) Inventor: Douglas P. Gethmann, Gladbrook, IA (US)

(73) Assignee: Fisher Controls International LLC, St. Louis, MO (US)

( * ) Notice: Subject to any disclaimer, the term of this patent is extended or adjusted under 35 U.S.C. 154(b) by 74 days.

(21) Appl. No.: 10/357,901

(22) Filed: Feb. 4, 2003

(65) Prior Publication Data

US 2004/0149951 A1 Aug. 5, 2004

(51) Int. Cl.[7] ............................................. F16G 11/12
(52) U.S. Cl. ................................... 403/43; 403/46
(58) Field of Search ........................... 403/43, 46

(56) References Cited

U.S. PATENT DOCUMENTS

| | | | |
|---|---|---|---|
| 1,016,835 A | 2/1912 | Levy-Maurice et al. | |
| 1,581,109 A | 4/1926 | Franke | |
| 2,059,175 A | 10/1936 | Myracle | |
| 2,859,991 A | 11/1958 | Mount | |
| 2,885,234 A | 5/1959 | Larson | |
| 3,685,761 A | 8/1972 | Zelinski | |
| 4,756,507 A | 7/1988 | McAndrew | |
| 4,778,349 A | 10/1988 | Browning | |
| 5,261,610 A | 11/1993 | Waryu et al. | |
| 5,782,078 A | * 7/1998 | Brantley | 403/46 X |
| 5,906,450 A | * 5/1999 | Ng | 403/46 |
| 5,921,441 A | 7/1999 | Small et al. | |
| 6,161,981 A | * 12/2000 | Dehlin | 403/43 |
| 6,257,551 B1 | 7/2001 | Veiga | |

* cited by examiner

Primary Examiner—John R. Cottingham
(74) Attorney, Agent, or Firm—Marshall, Gerstein & Borun LLP

(57) ABSTRACT

A stem connector assembly includes a connector body formed from a single piece of metal, and having a frame portion and a valve stem passageway extending through the frame portion. In one aspect, the connector body also includes an actuator stem passageway extending through the frame portion, and has a locking unit. The locking unit couples an actuator stem and a valve stem to the connector body. In operation, the stem connector assembly provides for unified movement of the actuator stem and valve stem, permits some misalignment between the two, thus reducing wear of the associated rod and stem components. The stem connector assembly further includes at least one mounting assembly, such as among others at least one NAMUR standard mounting assembly, to facilitate ready mounting of component elements associated with a stem connector assembly, such as a positioner, for example. The connector assembly also includes a size adjustment system, to accommodate a wide variety of valve and/or actuator stem sizes without exchanging for a connector body of another size.

19 Claims, 16 Drawing Sheets

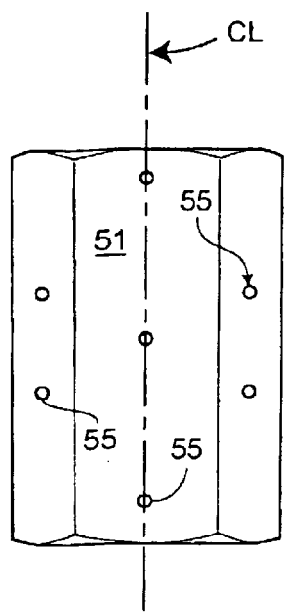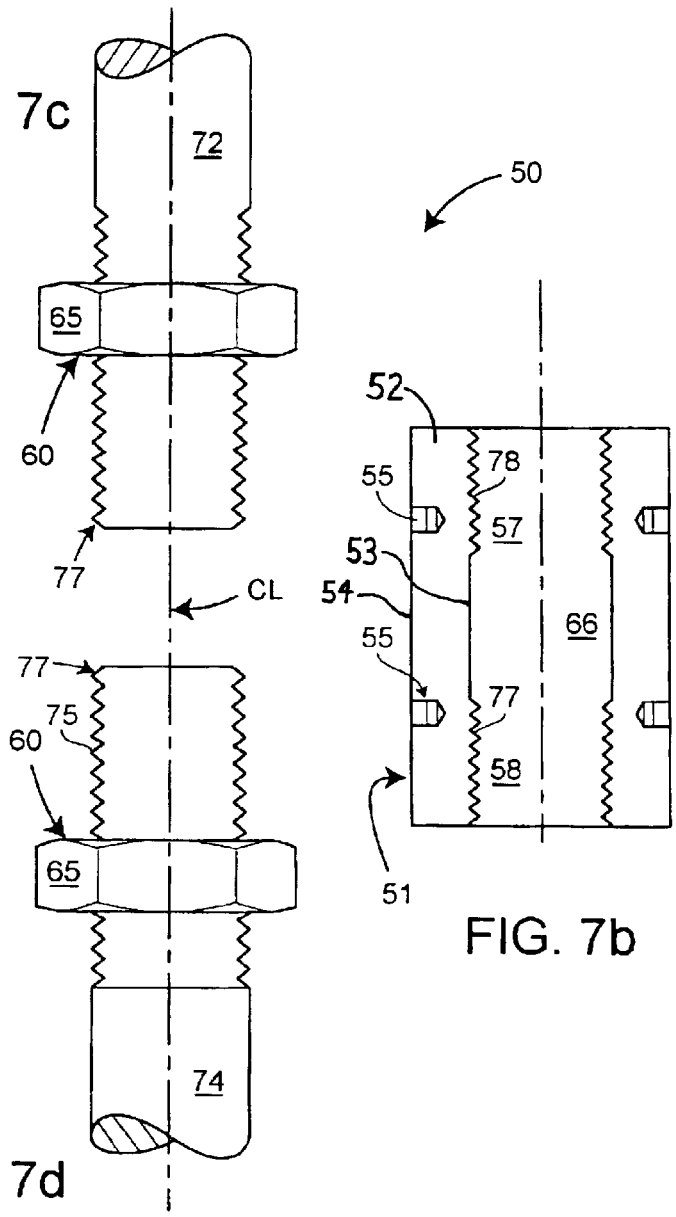
FIG. 7c
FIG. 7a
FIG. 7b
FIG. 7d

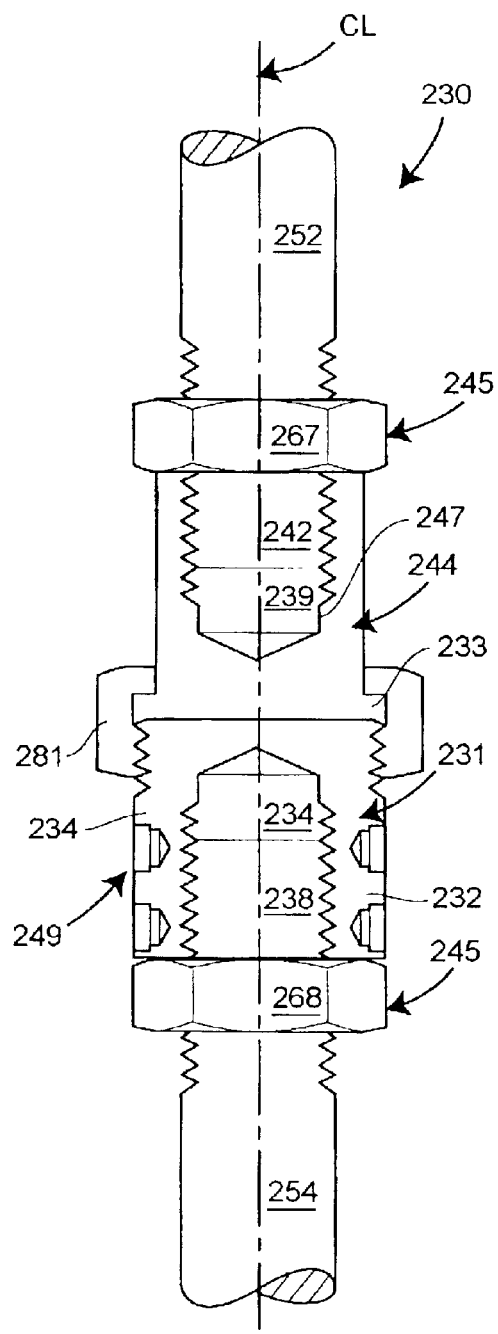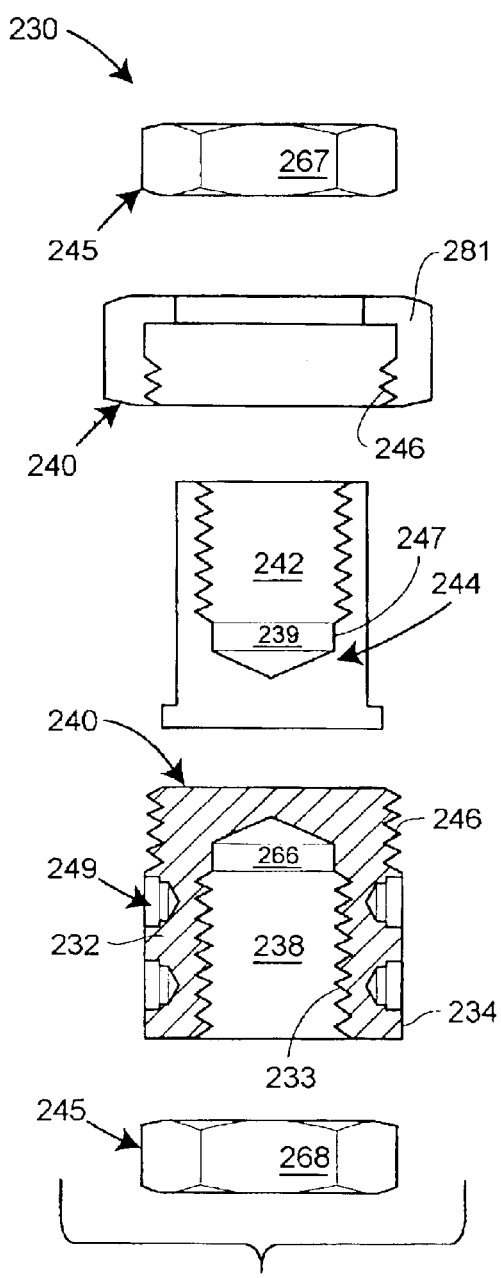
FIG. 17a
FIG. 17b

STEM CONNECTOR ASSEMBLY

FIELD OF THE INVENTION

The present invention generally relates to an assembly for coupling an actuator rod to a valve system, such as a sliding stem valve, and more particularly, to a stem connector assembly having a connector body that is formed as a single piece.

BACKGROUND OF THE INVENTION

Typical connectors used to connect an actuator rod to a valve stem often include a clamp assembly made from two pieces, each threaded at one end to connect to either the valve stem or the actuator rod. The two pieces are often fastened together by bolts, and provide a clamping force to keep the stem and rod from turning.

Current methods for manufacturing stem connectors are difficult, labor intensive, and costly, because they are made by machining carbon steel or stainless steel bar stock. Great care must be taken to manufacture these pieces because the threading must precisely match the threading of the respective actuator and valve stem to optimally secure the actuator to the valve stem. Because of these meticulous threading and tapping procedures, the two pieces that form a single stem connector assembly must always be kept in matched pairs so that assembly can be achieved, and damage to stem and actuator rod threads can be prevented.

However, matched pair stem connectors have many disadvantages. For example, because the threads of each pair must match up to one another, they are sent from the manufacturer as a unique set. Thus, the stocking, identification, handling, transportation, and assembling of these customized parts is expensive in that both pieces must remain together. The weight associated with two solid blocks forming the matched pair of stem connectors also creates extra labor, shipping, and other manufacturing costs.

Furthermore, in addition to manufacturing, assembling a stem connector for operative engagement with a valve assembly is typically an expensive, labor-intensive process. Illustratively, a general service valve assembly by-and-large features a bifurcated design. The bifurcated design requires careful arrangement of each half of the components comprising the valve assembly prior to locking the halves together. In particular, in one half of a valve assembly, the actuator and actuator rod, joins with the other half of the valve assembly, including the control valve and valve stem. Accordingly, each piece of the matched pair stem connector is integrated with a respective one half of the actuator rod and valve stem assemblies. Specifically, the threaded ends of the valve stem and actuator rod engage with the tapped holes of each piece of the matched pair stem connector. At least one fastening bolt, and often several, is also directed through the two pieces of the matched pair stem connector during the unification of the valve stem assembly. Thus, there are many difficulties associated with assembling the bifurcated valve stem connector in preparation for operation.

One design deficiency present in current stem connectors is the inability to accommodate a wide variety of actuator rod and/or valve stem lengths and diameter sizes. This is because a matched pair stem connector assembly is typically machined to accommodate only one specific size of valve and actuator stem. Also, so-called positioners, as mounted to an actuator assembly, actuator rod or stem connector, are often used to receive control signals from a processor, and thus, provide information for positioning the actuator rod with respect to the valve. However, many positioners cannot be coupled to a given stem connector. Unfortunately, due to size, space, and other constraints, and particularly if not built according to the known NAMUR or other standard specifications, stem connectors often do not accommodate a variety of stem positioner sizes and models. Thus, there is a long felt need for interchangeability of components associated with stem connectors.

Many of today's valve assemblies are expensive by design and feature numerous, heavy, and difficult-to-assemble components, but to remain competitive, often simple, low-cost components, including stem connectors, are required. Thus, valve stem connectors need to be inexpensive, reliable, easy-to-manufacture and easy to use, but many connectors do not satisfy these requirements.

Thus, there currently remains a need for a stem connector that is lightweight, compact, easy to machine, simple to operate and assemble, and is also interchangeable with other components associated with a valve assembly.

SUMMARY OF THE INVENTION

A stem connector assembly for engaging a valve is provided, where the stem connector assembly includes a connector body formed from a single piece of metal, with the connector body including a frame portion having an inner and outer surface. A valve passageway extends from the outer surface through the frame portion, and in one aspect, the connector body also includes an actuator passageway extending from the outer surface through the frame portion.

The valve passageway receives a portion of the valve assembly, such as the valve stem, while the actuator passageway receives a portion of the actuator, such as an actuator rod. In operation, the connector assembly provides unified movement of the actuator and valve stem so as to variably open, close, or throttle the valve member relative to the associated valve seat. Thus, based on a control signal, the connector assembly permits the actuator, including through any associated positioner, to drive the valve stem to move either toward or away from the valve seat.

The stem connector assembly also includes a locking unit, which secures the connector body to the actuator stem, and also similarly secures the connector body to the valve stem. Hence, the connector body couples to both the actuator and to the valve via the locking unit.

The stem connector assembly includes at least one mounting assembly which receives a component element so as to couple the component element to the connector assembly. In this context, a "component element" refers to any component that joins with the connector assembly to facilitate operational movement of the actuator and/or valve stems. For example, in the general service valve industry, a component element may include a positioner, to relay information and control instructions that are associated with the location of the valve stem and/or actuator stem while uniformly moving with respect to one another.

In one aspect, the mounting assembly is formed by the connector body, and for example, could include at least one NAMUR standard mounting assembly. For the General Service valve industry, a connector with at least one NAMUR standard mounting assembly will accommodate a positioner manufactured to design specifications based on the NAMUR standard. Hence, a wide variety of component elements could be interchangeably integrated in the present invention for operation with a sliding stem actuator and a control valve.

The stem connector assembly can also include a size adjustment system coupled to the connector body, which can accommodate either valve stems or actuator stems of various sizes. The size adjustment system can include at least one inner chamber, where the inner chamber is configured to accommodate a wide range of manufacturer specified dimensions, including the maximum allowable dimensions for either the valve stem or the actuator stem. The inner chamber can communicate with either the actuator stem passageway or the valve stem passageway. The actuator stem passageway can form the inner chamber. In operation, the valve stem passes from the valve passageway of the stem connector assembly, through the actuator passageway, and is received by the inner chamber. In this manner, the connector body can accommodate an unusually large valve stem without exchanging one connector body for another of a different size.

The size adjustment system can also include a spacer element which can accommodate variations in size associated with either the valve stem or the actuator stem. The spacer element is typically coupled to the connector body, and can be releasably coupled to the connector body. The inner chamber can be formed by the spacer element, which allows the inner chamber of the spacer element to receive either the actuator or valve stem.

BRIEF DESCRIPTION OF THE DRAWINGS

The present invention is illustrated by way of example and not limitation in the accompanying Figures, and in which:

FIGS. 7a–7d are a series of side elevation views illustrating one exemplary embodiment of a stem connector assembly, the embodiment including a connector body formed from a single piece as shown in FIG. 7a, the connector body shown in cross sectional view in FIG. 7b, a locking unit coupled to an actuator stem shown in FIG. 7c, and a locking unit coupled to a valve stem shown in FIG. 7d;

FIGS. 17a and 17b are an assembly view in cross section illustrating a size adjustment system as related to a locking unit and the connector body of FIG. 16, in particular the size adjustment system is depicted as engaged with the connector body in FIG. 17a, and the size adjustment system is depicted in exploded cross section view in FIG. 17b.

It will be understood that the dimensions of some of the elements in the Figures may be exaggerated relative to the other elements to help improve understanding of the embodiments of the present invention. In the figures, like numerals are used to refer to like and corresponding parts of the various accompanying drawings.

DETAILED DESCRIPTION OF THE INVENTION

It is to be understood that the following disclosed embodiments are merely exemplary of the invention, which may be embodied in various forms.

Figure 1:
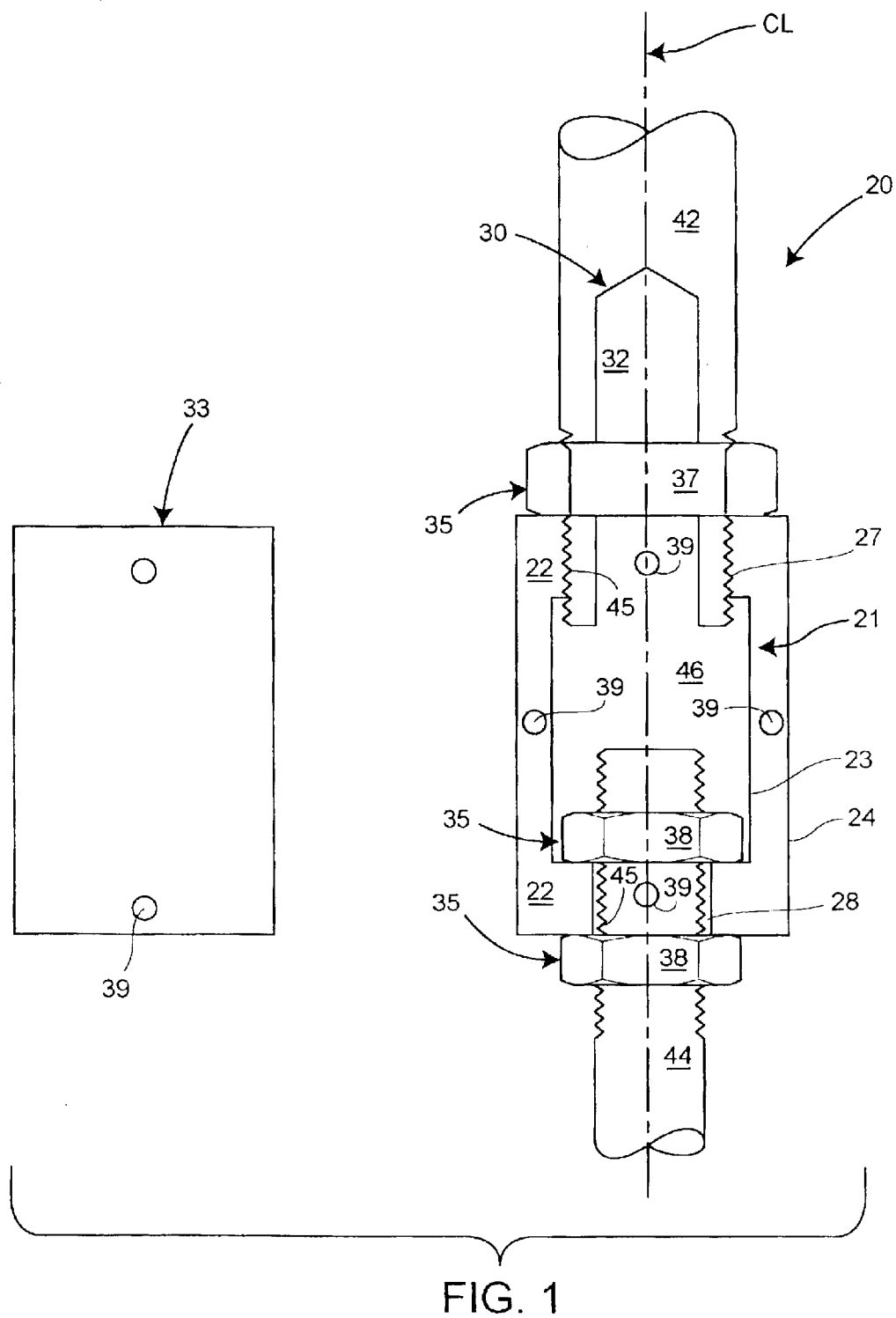
FIG. 1 is a cross sectional view illustrating a stem connector assembly for coupling an actuator stem to a valve stem according to the present invention featuring at least one mounting assembly.

FIG. 1 features a first exemplary embodiment of an easy-to-manufacture, low cost, and simple-to-use stem connector assembly, generally denoted by reference numeral 20, for coupling an actuator stem 42 to a valve stem 44. Other applications of the stem connector assembly 20 described herein are also possible.

The connector assembly 20 includes a connector body 21, which is formed from a single piece of metal, such as cast or milled from carbon steel or stainless steel material. Also, the metal connector body 21 is preferably formed by a casting process so that little machining and tapping is required thereafter to complete its formation.

Figure 2:
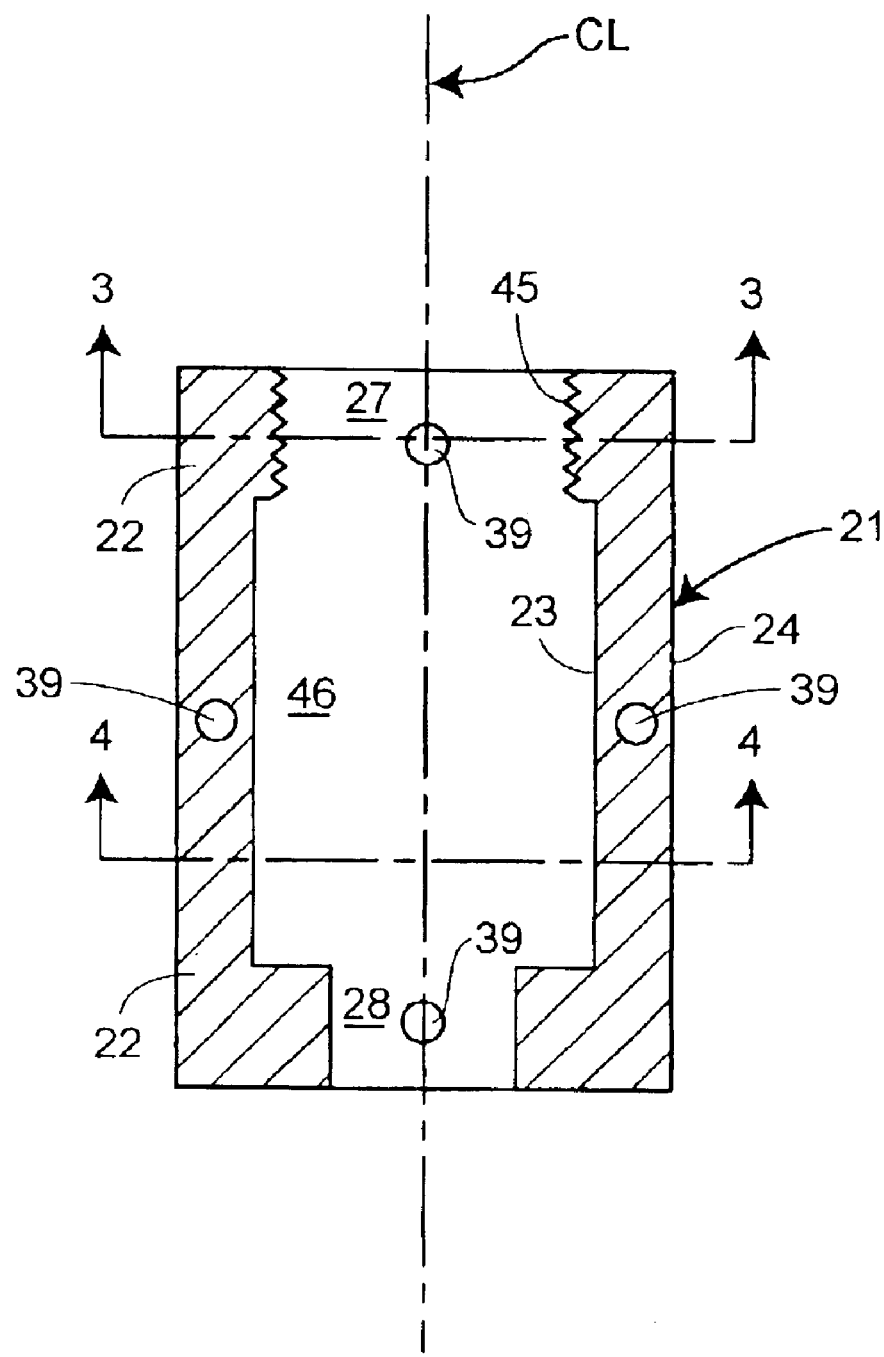
FIG. 2 is a cross sectional view of the connector body of FIG. 1.
Figure 3:
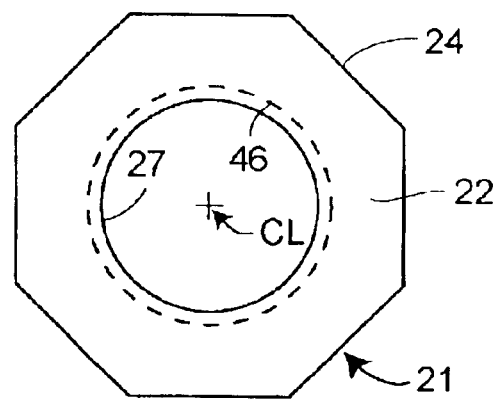
FIG. 3 is a cross sectional view taken along the plane 3—3 of FIG. 2 illustrating one exemplary embodiment of the connector body.

The connector body 21, as shown in FIGS. 1 and 2, includes a frame portion 22 which has an inner surface 23 and an outer surface 24. As seen in FIGS. 1–3, the connector body 21 includes an actuator stem passageway 27, which extends from the outer surface 24 through the frame portion 22. In the exemplary embodiment of FIG. 1, the actuator stem passageway 27 extends from the outer surface 24, through the frame portion 22, to the inner surface 23. The actuator stem passageway 27 threadedly receives the actuator stem 42.

In a similar manner, the connector body 21 includes a valve stem passageway 28, which extends from the outer surface 24 through the frame portion 22. In FIG. 1, the valve stem passageway 28 extends from the outer surface 24 through the frame portion 22 to the inner surface 23, and the valve stem passageway 28 receives the valve stem 44. The valve stem passageway 28 threadedly receives the valve stem 44.

As also seen in FIGS. 1 and 2, the connector body 21 may further include an inner connector chamber 46. As shown in FIG. 2, the inner surface 23 of the frame 22 forms the inner connector chamber 46. The space formed by that inner connector chamber 46 helps facilitate a rapid formation of a connector body, such as through various manufacturing processes which use minimal material, such as for example by dies, molds or other casting procedures. The presence of the inner connector chamber 46 permits for a lightweight connector body, as well as enables the operator to easily manipulate and position the connector body 21 while coupling the actuator and valve stems 42, and 44 respectively.

In the embodiment shown in FIGS. 2–5, and particularly in FIG. 3, the outer surface 24 of the connector body 21 is configured to receive a torque, and more specifically, the outer surface 24 may define an octagonal (or a hexagonal) configuration for optimally receiving a wrench thereon. The wrench (not shown) acts to secure the connector body 21 in position as the valve stem 44 and the actuator stem 42 join with the connector body 21. However, it will be understood that other shapes may be employed for the outer surface 24, such as the preferred generally square shape of the embodiment of FIG. 4, or various other portions of the connector body 21, for receiving a torque to connector body 21.

Figure 4:
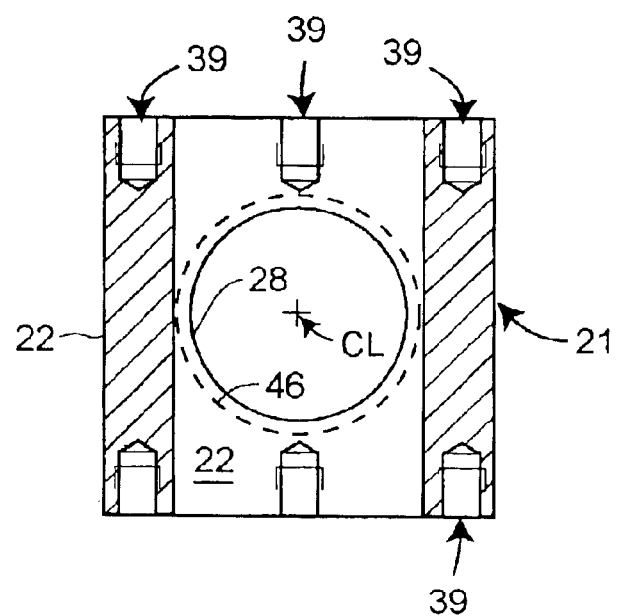
FIG. 4 is a cross sectional view taken along the plane 4—4 of FIG. 2 illustrating one exemplary embodiment of the connector body.

As seen in FIGS. 1 and 4, the connector body 21 includes a centerline, CL. All components comprising the connector body 21 are positioned in a radially symmetrical manner with respect to the centerline CL. For example, the frame portion 22 is coaxially positioned with respect to that centerline CL, as are the actuator stem passageway 27 and the valve stem passageway 28. In the embodiment of FIG. 4, where the outer shape is generally square, the frame portion 22 and valve stem passageway 28 are positioned relative to the centerline CL. However, the connector body 21 can also be formed to be substantially cylindrical in shape (not shown).

In operation, the connector assembly 20 facilitates a unified movement of the associated valve stem 44 and the actuator stem 42, which in turn causes the controlled opening, closing or throttling of the valve relative to the valve seat in the associated sliding seat valve (neither shown). During assembly, the connector body 21 quickly positions between the actuator stem 42 and valve stem 44 (see FIG. 1). In operation, the inner surface 23 of connector body 21 maintains contact with the actuator stem 42 and the valve stem 44.

In one exemplary embodiment, the connector assembly 20 further includes at least one mounting assembly 39. That is, as seen in FIG. 4, that at least one mounting assembly 39 is defined by the connector body 21, and preferably includes a standard mounting assembly. In this disclosure the term "standard mounting assembly" refers to a mounting assembly machined to the standard specifications widely used in the valve industry, such as among others the NAMUR, ANSI, and ASME standards specifications. It should be understood that for all embodiments of the present invention, including among others those embodiments shown in FIGS. 1–17, the stem connector assembly is configured to include at least one mounting assembly. Accordingly, as shown in FIG. 1 for example, the at least one mounting assembly 39 receives at least one component element 33, e.g. a positioner. Preferably, the at least one component element 33 comprises a component based on standard specifications widely used in the industry, such as among others, the NAMUR standard specifications. Thus, through the at least one mounting assembly 39 formed according to NAMUR specifications, the connector body 21 can interface with a variety of component elements that also accommodate the NAMUR standard. For example, a positioner featuring NAMUR design specifications can join with the connector body 21 via the at least one NAMUR standard mounting assembly 39. Because the positioner and connector assembly 20 share the same spatial relationships provided by the NAMUR standard, accurate feedback information associated with the position of either the actuator or valve stems 42, and 44 may be obtained. In turn, that feedback information is used, in part, to accurately position the actuator stem 42 so as to ultimately control the valve stem 44. Thus, due to the presence of the standard specifications, the at least one mounting assembly 39 can accommodate a wide variety of component elements and models offered by various different manufacturers. As a result, the at least one mounting assembly 39 facilitates ready interchangeability of component elements that are associated with the connector assembly 20.

Figure 5:
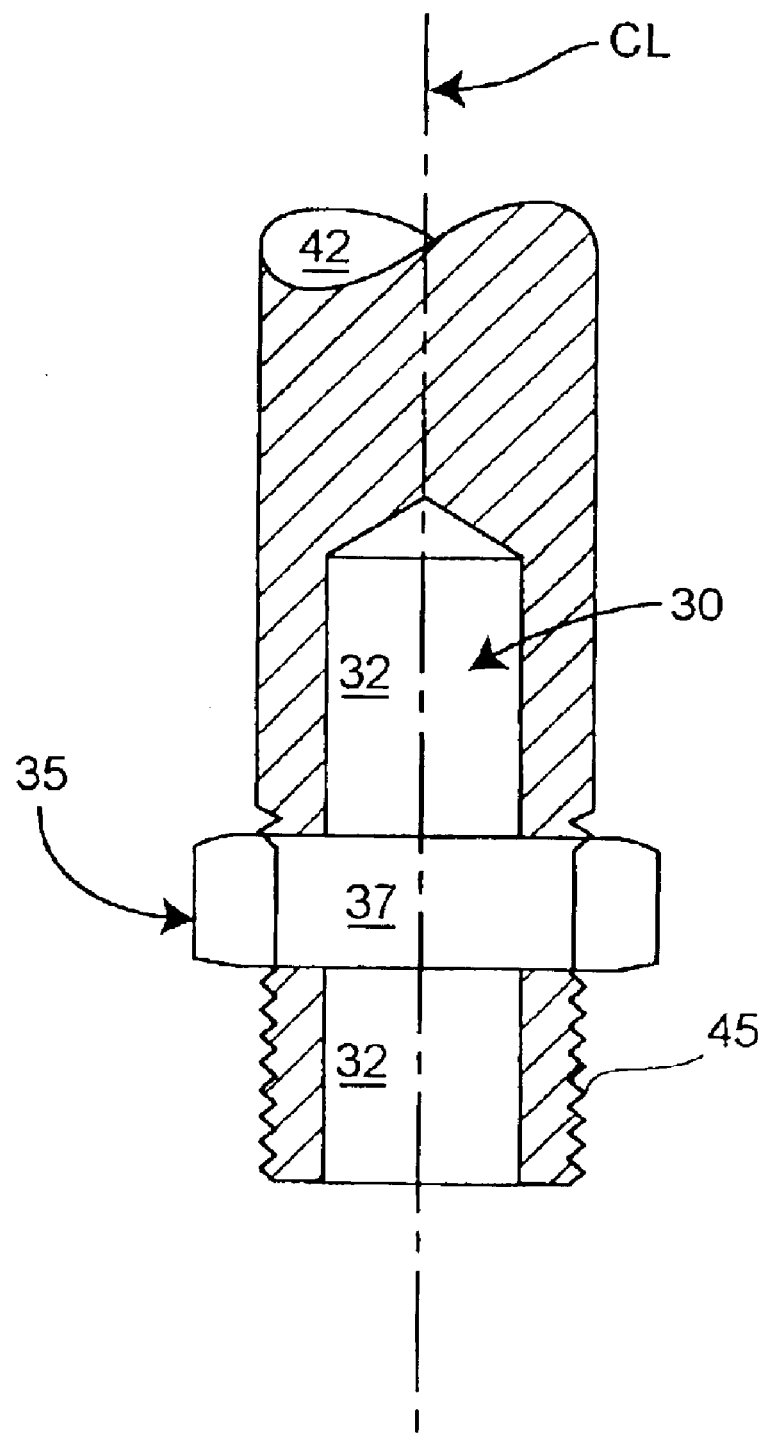
FIG. 5 is a cross sectional view of a locking unit coupled to the actuator stem of FIG. 1, the actuator stem featuring a length adjustment system.

Turning to FIG. 5, the actuator stem 42 is shown there as coupled with a locking unit 35. As seen, a size adjustment system 30 engages with the actuator stem 42, in the form of at least one receiving chamber 32, which preferably is a bore machined from the distal end of the actuator stem 42. The length of the bore forming receiving chamber 32 is dependent on the maximum length of the longest possible valve stem for engagement with the connector assembly 20. Various suitable lengths can be used for that bore. In operation, the valve stem 44 may be potentially long enough to extend through the connector body 21 and up into the at least one receiving chamber 32. The diameter of the at least one receiving chamber 32 is larger than that of the valve stem 44, so as to engagedly receive the valve stem 44 therein. Accordingly, the size adjustment system 30 potentially accommodates a wide variety of valve stem sizes, including relatively long valve stems, without interchanging one stem connector assembly for another of appropriate size. Such long valve stems will vary, depending upon the construction and style of the valve, and upon the related accessories involved in a given application.

As seen in the embodiment of FIG. 5, the actuator stem 42 includes an engagement surface 45, which operates to secure to the frame portion 22 along the actuator stem passageway 27. That engagement surface 45 is preferably threaded for use with the tapped actuator stem passageway 27 of FIGS. 1 and 2.

Also, in FIG. 5, the locking unit 35 is shown as including at least one nut, that is, a lock nut 37 is threadably secured to the engagement surface 45, and preferably, see FIG. 1, the fixed lock nut 37 abuts the frame portion 22.

Figure 6:
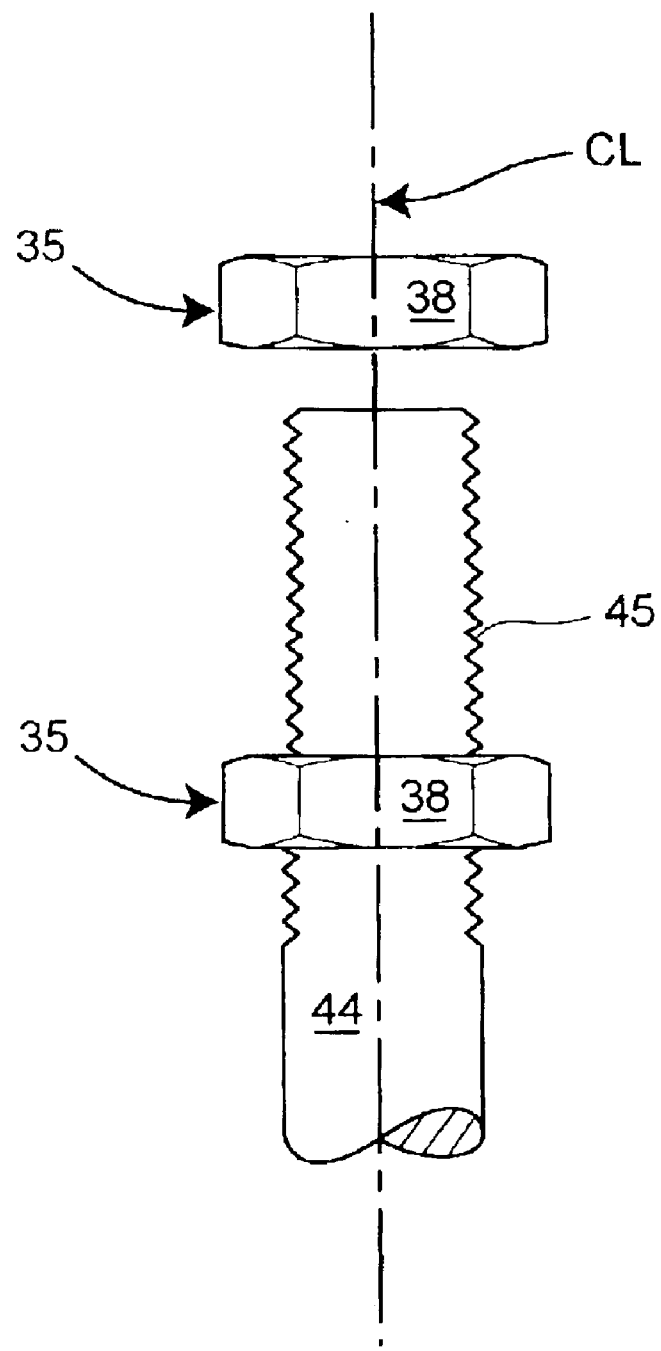
FIG. 6 is a cross sectional view of a locking unit coupled to the valve stem of FIG. 1.

FIG. 6 on the other hand depicts the relationship between the valve stem 44 and the locking unit 35. For the one embodiment of FIG. 6, the locking unit 35 includes a pair of nuts. Also, as shown in FIG. 1, the frame portion 22 is partially positioned between the two jam nuts 38. For that FIG. 1 embodiment, the valve stem passageway 28 comprises a bore that is not tapped. Alternatively, in one exemplary embodiment, the valve stem passageway 28 is tapped therethrough. The jam nuts 38 thus facilitate a threaded linkage between the connector assembly 20 and the valve stem 44.

The valve stem 44 includes an engagement surface 45, which in the exemplary embodiment of FIG. 6, is disposed on the distal end of the valve stem 44. In operation, the valve stem passageway 28 receives the engagement surface 45 so that the connector body 21 is securely positioned, in part, between the respective locking units 35, which in FIGS. 5 and 6 is between the lock nuts 37 and 38.

Referring to FIG. 7, another embodiment of a stem connector assembly is provided, as generally denoted by reference numeral 50. The stem connector assembly 50 couples an actuator stem 72 to a valve stem 74, and includes a connector body 51. In the exemplary embodiment of FIG. 7a, a multi-sided prism, such as for example a hexagonal prism having a centerline CL, characterizes the connector body 51; however, square, cylindrical, and yet other configurations can be used for the connector body 51.

As shown in FIG. 7b, which illustrates a cross sectional view of the connector body 51 of FIG. 7a, the connector body 51 includes a frame portion 52, which as an inner surface 53 and an outer surface 54. The connector body 51 includes a valve stem passageway 58 which extends from the outer surface 54 through the frame portion 52. The connector body 51, in the embodiment of FIG. 7b, includes an actuator stem passageway 57 which extends from the outer surface 54 through the frame portion 52. The connector body 51 further includes an inner connector chamber 66, which in the exemplary embodiment of FIG. 7b, is formed by the frame 52. The presence of the inner connector chamber 66 permits quick manufacture of the connector body 51, such as by casting or machining, and with minimal material being required.

The connector body 51 includes at least one mounting assembly 55. In the exemplary embodiment of FIG. 7a, the connector body 51 forms the at least one mounting assembly 55. That assembly 55 facilitates interchangeability of component elements and other components that are associated with the connector assembly 50. Preferably, that at least one mounting assembly 55 comprises a NAMUR standard mounting assembly.

The connector assembly 50 also includes a locking unit 60, and for the embodiment of FIG. 7, that locking unit 60 includes at least one securing nut 65; however, other means can be used for securing the connector body 51 to the actuator stem 72 and the valve stem 74, such as among other examples, a slip ring (not shown).

As shown in FIGS. 7c and 7d, the actuator stem 72 and the valve stem 74 each include a respective engagement surface 77. Specifically, the engagement surface 77 of the actuator stem 72 includes left-handed threading 76, while the engagement surface 77 of the valve stem 74 includes right-handed threading 75. Accordingly, for the connector body 51 of FIG. 7, the valve stem passageway 58 is tapped to optimally receive the right-handed threading 75 of the valve stem 74, while the actuator stem passageway 57 is tapped to receive the left-hand threading 76 of actuator stem 72. During assembly then, the single piece connector body 51 undergoes a turnbuckle effect, which draws the left-handed threading 76 of the actuator stem 72 and right-hand threading 75 of the valve stem 74 together to thereby securely engage with the stem connector body 51.

Figure 8:
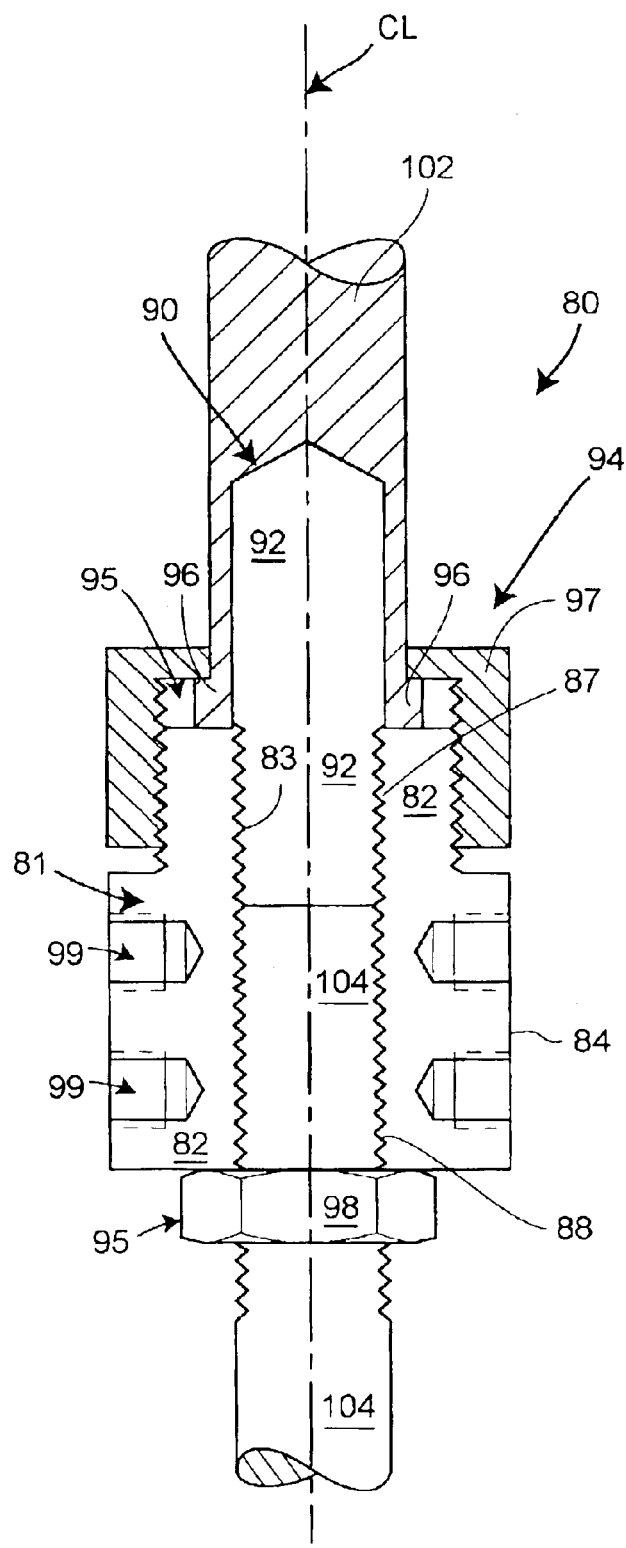
FIG. 8 is a cross sectional view illustrating one exemplary embodiment of a stem connector assembly featuring at least one mounting assembly.

FIG. 8 depicts yet another exemplary embodiment of a stem connector assembly, generally denoted by reference numeral 80. The connector assembly 80 couples an actuator stem 102 to a valve stem 104, and includes a connector body 81 which has a frame portion 82. The frame portion 82 includes an inner surface 83 and an outer surface 84. The connector body 81 further provides a valve stem passageway 88 which extends from the outer surface 84 through the frame portion 82. For the exemplary embodiment of FIG. 8, the valve stem passageway 88 is tapped so as to threadedly receive the valve stem 104, and a locking nut 98 is provided to secure the connector body 81 to the valve stem 104. Further, the connector body 82 includes an actuator stem passageway 87 which extends from the outer surface 84 through the frame portion 82.

In the embodiment of FIG. 8, the connector body 81 includes at least one mounting assembly 99, as formed by the connector body 81. Preferably, the at least one mounting assembly 99 is a NAMUR standard mounting assembly. The connector assembly 80 of FIG. 8 further includes a length adjustment system 90, which includes at least one inner chamber 92. Preferably, the at least one inner chamber 92 is disposed on the distal end of the actuator stem 102, with the at least one inner chamber 92 comprising a bore tapped at the distal end of the actuator stem 102.

Figure 9:
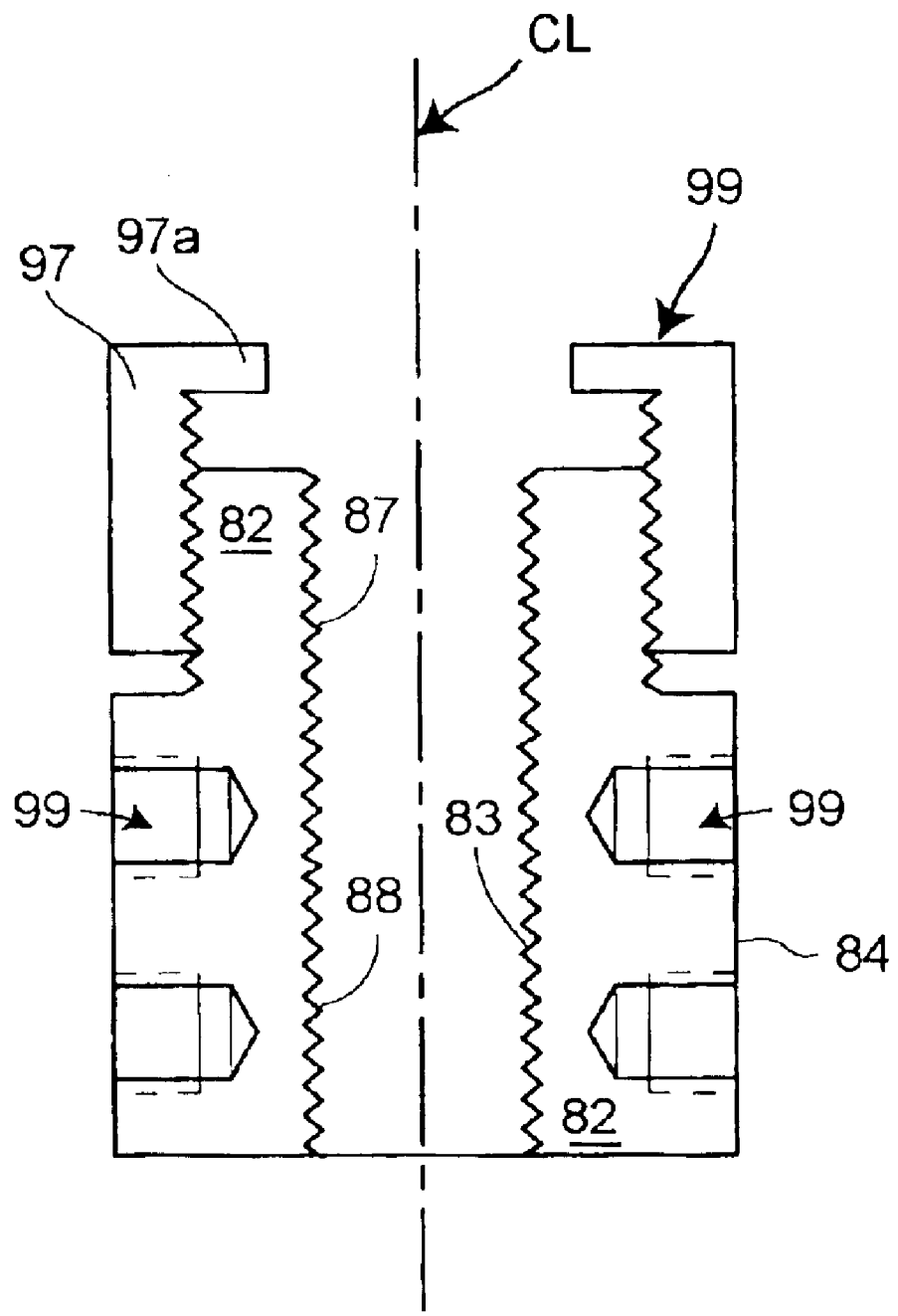
FIG. 9 is a detailed cross sectional view illustrating a locking unit coupled to the connector body of FIG. 8.

Further, the connector assembly 80 includes a locking unit 95 which acts to couple the connector body 81 to both the actuator stem 102 and the valve stem 104. In the embodiment of FIG. 8, the locking unit 95 comprises a locking cap assembly 94 which secures the distal end of the actuator stem 102 to the connector body 81. As shown in FIGS. 8 and 9, the locking cap assembly 94 includes a cap unit 97 which is tapped, and which threadedly receives and secures a portion of the connector body 81. The cap unit 97 has a locking portion 97a which, in operation, wedges against a radially-extending flange portion 96 as formed by the actuator stem 102 and that extends outwardly from the centerline CL.

During assembly, the cap unit 97 provides a turnbuckle effect as it moves along the outer surface 84 toward the center of the connector body 81. The advancing cap unit 97 drives the locking portion 97a to rest against the flange portion 96, so that the flange portion 96 is secured between the locking portion 97a and the outer surface 84. In this fashion, the locking cap assembly 94 secures the connector body 81 to the actuator stem 102.

Figure 10:
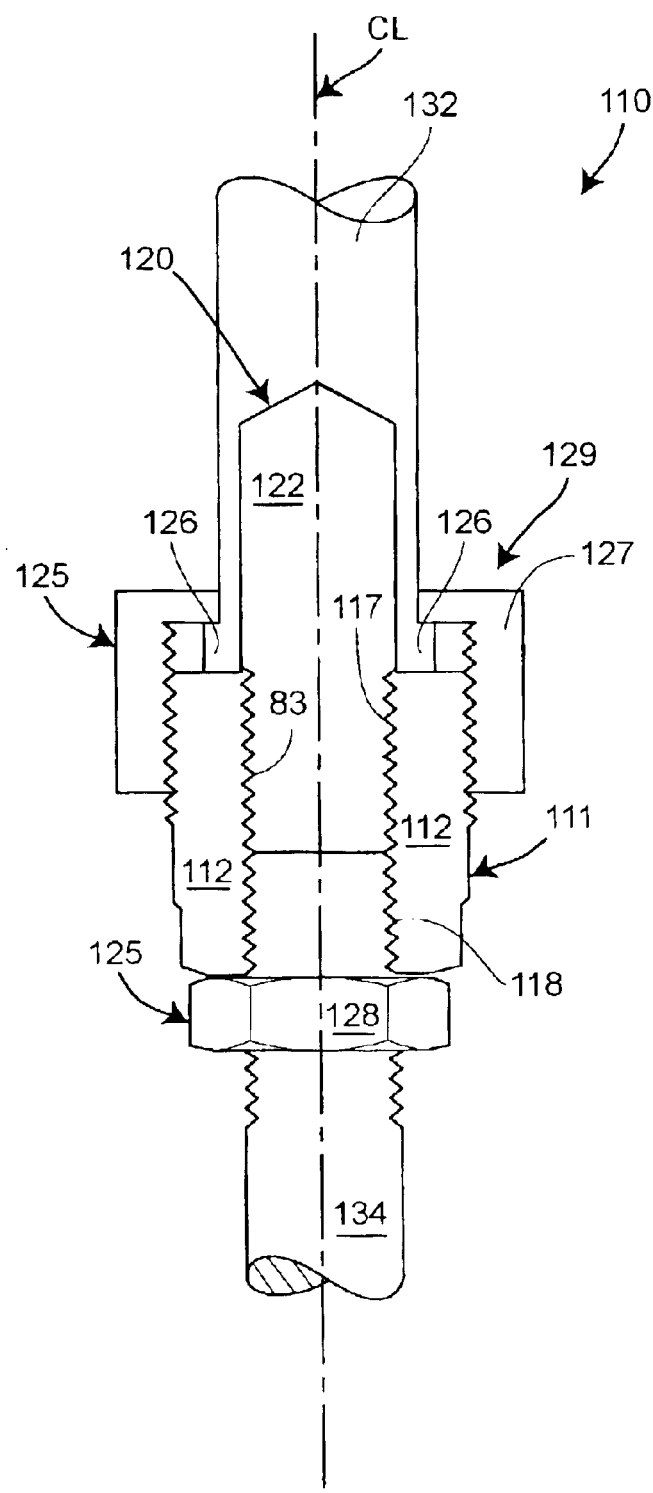
FIG. 10 is a cross sectional view illustrating one exemplary embodiment of a stem connector assembly.

FIG. 10 shows another exemplary embodiment of a stem connector assembly, generally denoted by reference numeral 110, which 110 is generally similarly configured to the connector assembly 80 of FIG. 8. However, one differentiating aspect, among others, is characterized in that the connector assembly 80 includes at least one mounting assembly 99, whereas the connector assembly 110 does not.

That is, in FIG. 10, the connector assembly 110 includes a connector body 111 formed from a single piece of metal, and including a frame portion 112. The connector body 111 includes a valve stem passageway 118 extending through the frame portion 112, and which threadedly receives the valve stem 134. The connector assembly 110 also includes a locking unit 125, which couples the connector body 111 to the actuator stem 132 and to the valve stem 134. The locking unit 125 includes a locking cap assembly 129 which, similar to the locking cap assembly 94 of FIG. 8, includes a cap unit 127. The cap unit 127 abuts a distal flange portion that extends radially outwardly from the actuator stem 132. The locking unit 125 further includes a lock nut 128 which secures the connector body 111 to the valve stem 134.

Figure 11:
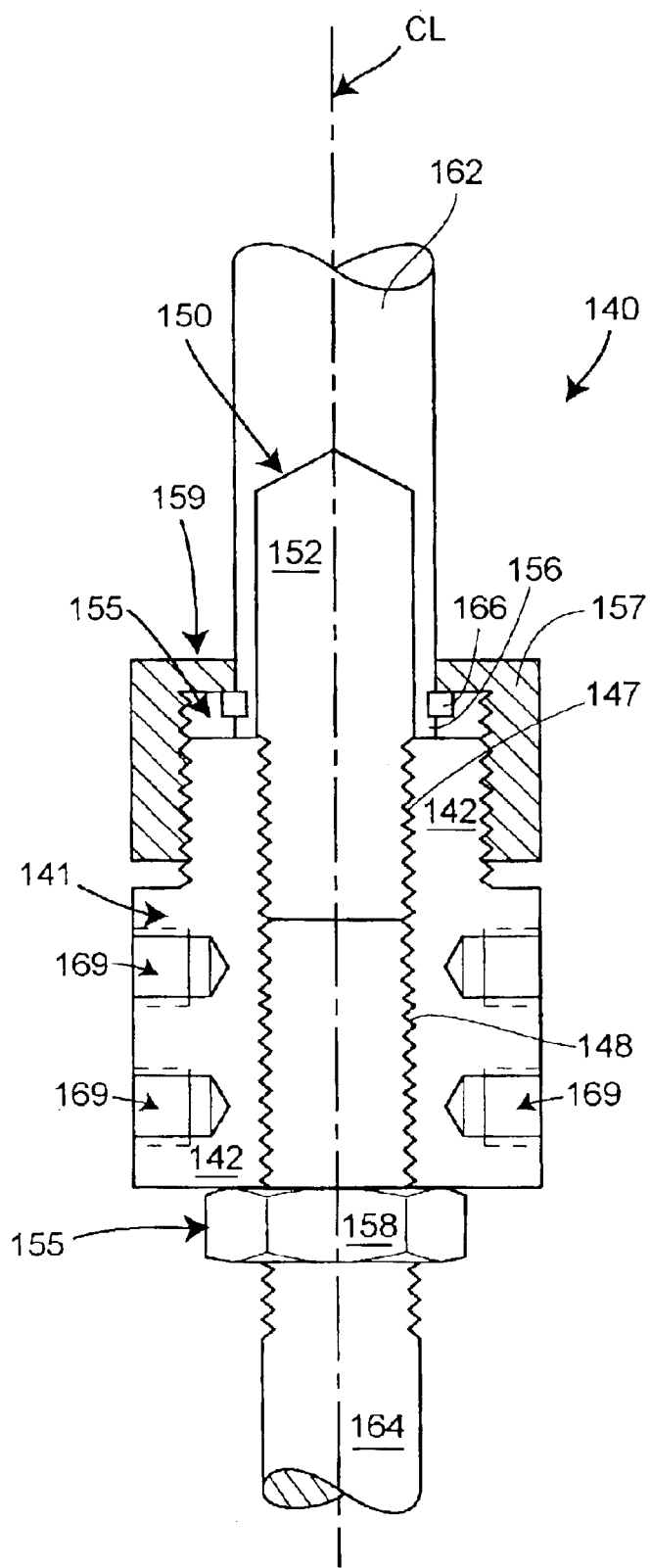
FIG. 11 is a cross sectional view illustrating one exemplary embodiment of a stem connector assembly featuring at least one mounting assembly.

The further embodiment of FIG. 11 shows yet another stem connector assembly, generally denoted by reference numeral 140. The connector assembly 140 is generally similar to the connector assembly 80 of FIG. 8, but one differentiating aspect, among others, is that the connector assembly 140 includes a snap ring assembly 159, whereas the connector assembly 80 includes a locking cap assembly 94. In particular, the connector assembly 140 includes a locking unit 155, which in FIG. 11, takes the form of a locking nut 158 to facilitate a secure attachment of the connector body 141 to the valve stem 164. The locking unit 155 includes a snap ring assembly 159 which in turn includes a cap unit 157 as secured to an outer surface 148 of a connector body 141. The snap ring assembly 159 also includes a snap ring 166.

During assembly of connector assembly 140, and as the cap unit 157 moves toward the center of the connector body 141, the cap unit 157 wedges against the snap ring 166. Specifically, the cap unit 157 traverses the actuator stem 162 toward the connector body 141. The cap unit 157 twists with a turnbuckle effect so as to ultimately wedge against the snap ring 166. A snap ring groove 156 is disposed on the distal end of the actuator stem 162, and the snap ring 166 is placed within the snap ring groove 156.

In the embodiment of FIG. 11, the connector body 141 includes at least one mounting assembly 169 which facilitates interchangeability of component elements and other components that are associated with the connector assembly 140. Preferably, the at least one mounting assembly 169 comprises at least one NAMUR standard mounting assembly.

Figure 12:
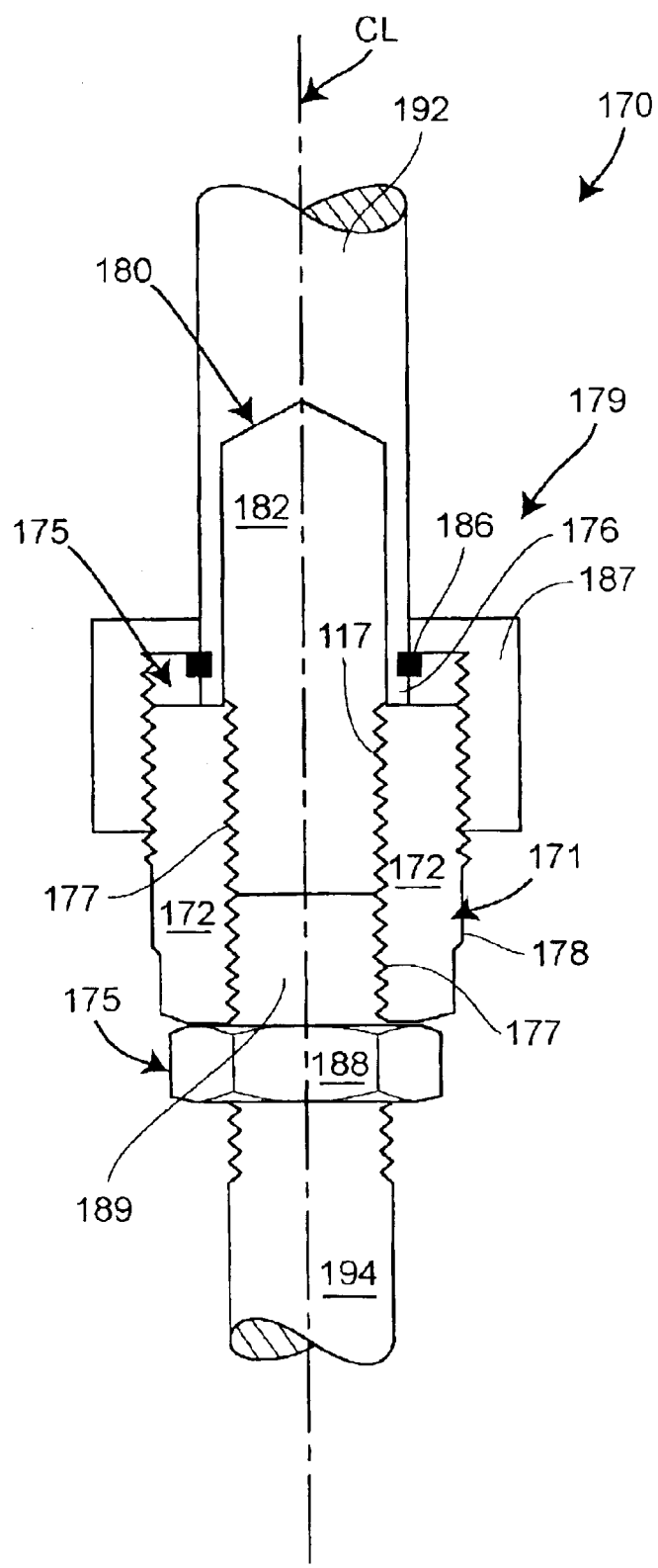
FIG. 12 is a cross sectional view illustrating one exemplary embodiment of a stem connector assembly.

FIG. 12 illustrates yet another exemplary embodiment of a stem connector assembly, generally denoted by reference numeral 170. The connector assembly 170 of FIG. 12 is generally similar to the connector assembly 140 of FIG. 11, but has differentiating aspects. For one example, the connector body 141 of FIG. 11 includes at least one mounting assembly 169, whereas the connector body 171 of FIG. 12 does not. It will be seen that the connector body 171 has a frame portion 172, which includes an inner surface 177 and an outer surface 178. A valve stem passageway 189 extends from the outer surface 178 through the frame portion 172. The connector assembly 170 has a size adjustment system 180 which includes an inner chamber 182 disposed on the distal end of an actuator stem 192. In the exemplary embodiment of FIG. 12, the actuator stem 192 defines the inner chamber 182.

Figure 13:
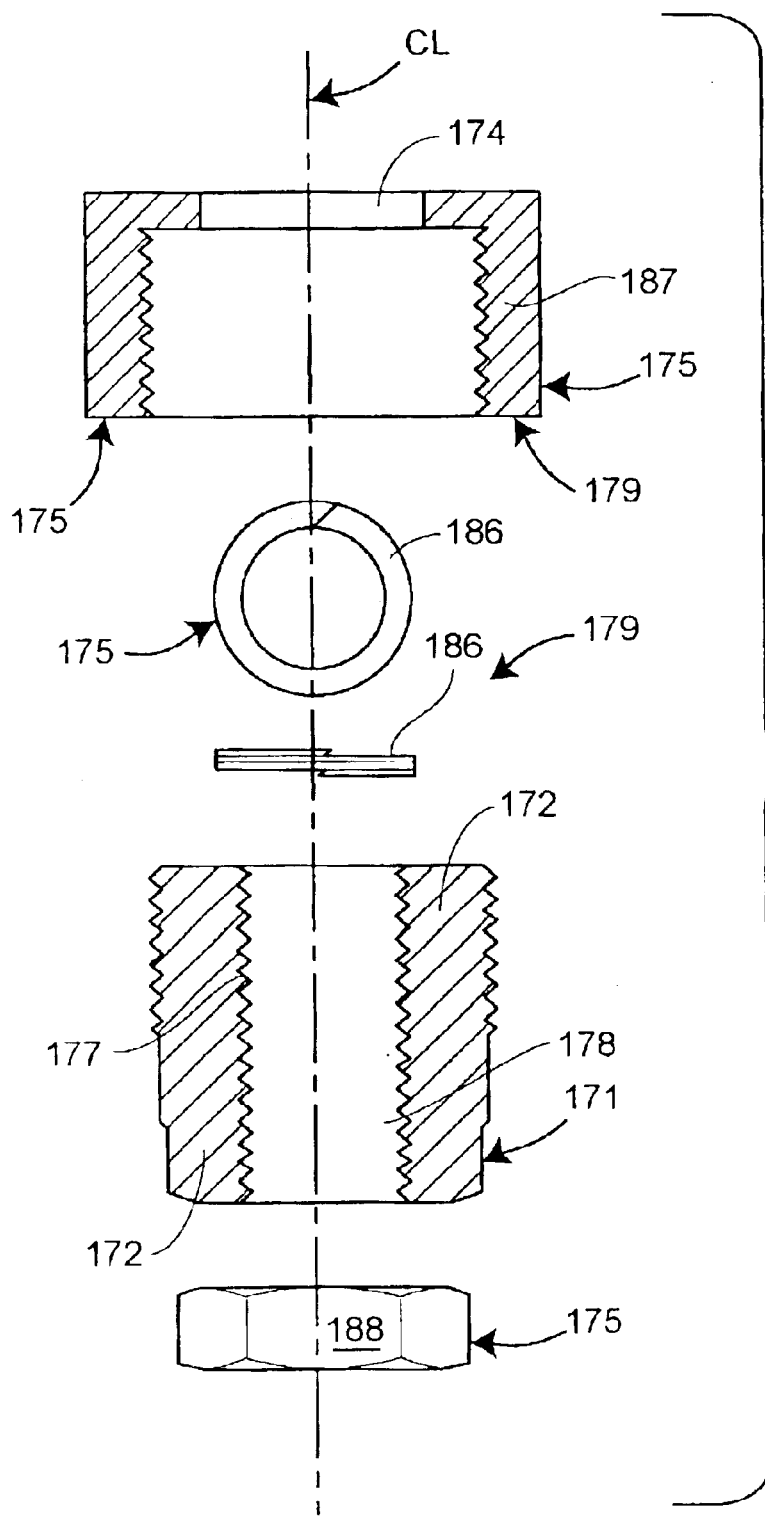
FIG. 13 is an exploded view in cross section illustrating a locking unit as related to the stem connector assembly of FIG. 12.

The stem connector assembly 170 also includes a locking unit 175. In reference to FIGS. 12 and 13, the locking unit 175 includes a snap ring assembly 179 which has a snap ring 186. In the exemplary embodiment, the snap ring 186 can comprise a spring. As also shown in FIGS. 12 and 13, the snap ring assembly 179 includes a cap unit 187 which defines a throughbore 174 that traverses the periphery of the actuator stem 192 as the cap unit 187 advances toward the center of the connector body 171. In this fashion, the snap ring assembly 179 secures the connector body 171 to the actuator stem 192. In the exemplary embodiment of FIG. 12, the locking unit 175 also includes a fastening nut 188, which secures the connector body 171 to a valve stem 194.

Figure 14:
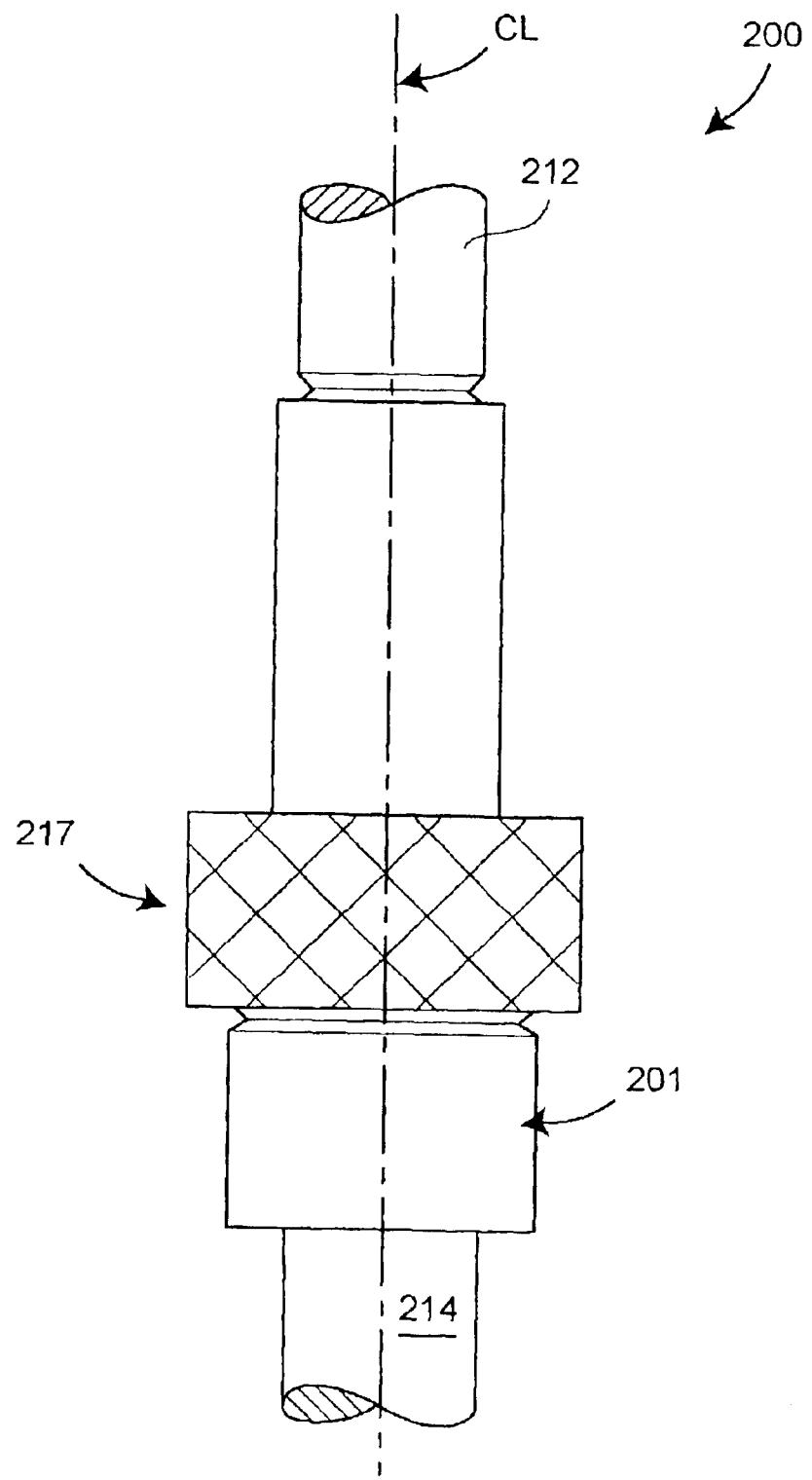
FIG. 14 is a side view illustrating one exemplary embodiment of a stem connector assembly.
Figures 15A, 15B:
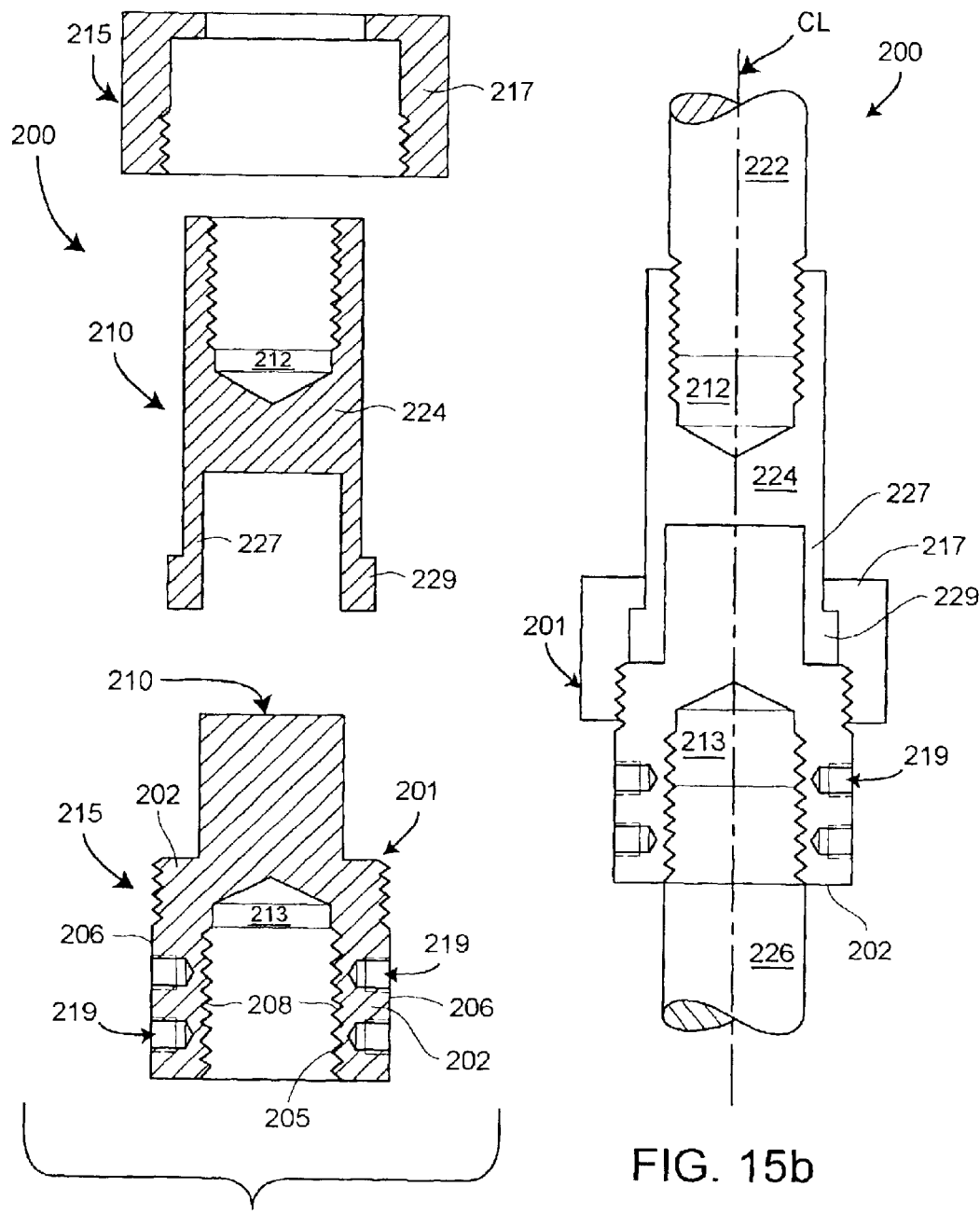
FIGS. 15a and 15b are an assembly view in cross section illustrating a size adjustment system as related to a locking unit and the connector body of FIG. 14, in particular the size adjustment system is depicted in exploded cross section view in FIG. 15a, and the size adjustment system is depicted as engaged with the connector body in FIG. 15b.

FIGS. 14–15 show yet a further exemplary embodiment of a stem connector assembly, generally denoted by reference numeral 200. The connector assembly 200 includes a connector body 201, which as shown in FIG. 14, is formed as a single piece. Referring to the exploded, cross sectional view of FIG. 15a, the connector body 201 provides a frame portion 202 having an outer surface 206 and a valve stem passageway 208, with passageway 208 extending from the outer surface 206 through the frame portion 202.

The connector assembly 200 (see FIG. 5a) also includes a size adjustment system 210, which in the exemplary embodiment shown, has a spacer element 224 and a receiving chamber 227. That receiving chamber 227 is formed by the spacer element 224 and as seen in FIG. 15b, a portion of the connector body 201 is seated within the receiving chamber 227. The size adjustment system 210 (see FIG. 15a) also includes a first inner chamber 212 formed by the spacer element 224. During assembly (see FIG. 15b), the actuator stem 222 is positioned and received within the first inner chamber 212. The spacer element 224 couples to the connector body 201 via a spacer lock cap 217. The connector body 201, formed from a single piece of metal, is secured to the valve stem 226. In operation, the first inner chamber 212 is able to accommodate various size differences associated with the actuator stem 222, such as among others, variations in its length or diameter, which can occur for example, when going from a smaller to a larger actuator mechanism for a given valve (with a given size valve stem).

In a similar manner, the connector body 201 may further provide a second inner chamber 213 (see FIG. 15a), and in the exemplary embodiment shown, the connector body 201 itself defines the second inner chamber 213. The valve stem passageway 208 and second inner chamber 213 communicate with one another as to optimally receive a valve stem 226, with the second inner chamber 213 permitting variations in size associated with the valve stem 226, such as among others, variations in length or diameter. The latter can occur when different size valves are used with a given size actuator (with a given size actuator rod).

In the exemplary embodiment of FIG. 15b, the spacer element 224 is coupled to the connector body 201 via a spacer lock cap 217, which in turn abuts a flange portion 229. The flange portion 229 can be provided by the spacer element 224.

It should be noted that the connector assembly 200 may include at least one mounting assembly 219, to facilitate interchangeability of component elements and other components that are associated with the connector assembly 200. That at least one mounting assembly 219 preferably comprises at least one NAMUR or other standard mounting assembly.

Figure 16:
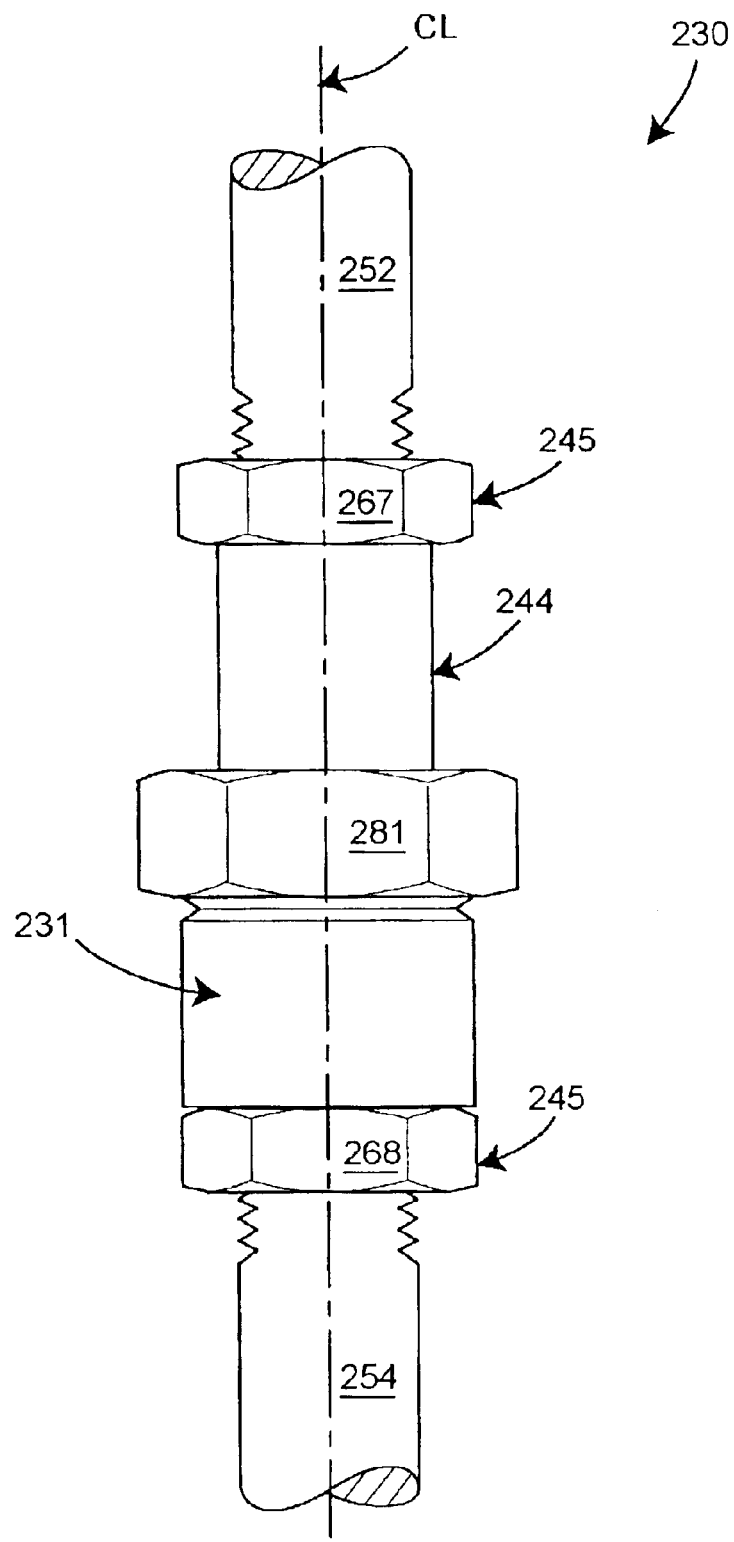
FIG. 16 is a side view illustrating one exemplary embodiment of a stem connector assembly.

FIGS. 16–17 depict yet another exemplary embodiment of a stem connector assembly, generally denoted by reference numeral 230. The connector assembly 230 of FIG. 16 is similar to the connector assembly 200 of FIG. 14, but there is one differentiating aspect, among others, namely, a locking unit 245 which includes a first fastening member 267 and a second fastening member 268. In contrast to connector assembly 200 of FIG. 14, a spacer element 244 of the connector system 230 abuts a connector body 231. Further, while there is a receiving chamber 227 in the spacer element 224, the connector assembly 230 of FIG. 16 does not include any such chamber.

In FIG. 17a, the connector assembly 230 includes the connector body 231 formed from a single piece of metal, such as by casting, and has a frame portion 232 which includes an inner surface 233 and an outer surface 234. The connector body 231 also includes a valve stem passageway 238, extending from the outer surface 234 through the frame portion 232 to an inner chamber 266. In the exemplary embodiment shown, the frame portion 232 defines the valve stem passageway 238.

In FIG. 17b, the connector assembly 230 is shown as including a size adjustment system 240 which has a spacer element 244 and an inner chamber 247. In the embodiment shown, the inner chamber 247 defines an actuator stem passageway 242 which extends from the periphery of the spacer element 244 through the frame portion 232. The size adjustment system 240 further includes a sizing chamber 239 which defines the actuator stem passageway 242, and a spacer lock cap 281 which couples the spacer element 244 to the connector body 231. In operation (see FIG. 17a), the spacer element 244 receives the actuator stem 252, and particularly, the actuator stem 252 couples to the spacer element 244 via the first fastening member 267. Further, the spacer element 244 couples to the connector body 231 via the spacer lock cap 281. During assembly, the connector body 231 receives the valve stem 254 through the valve stem passageway 238 and, in turn, the valve stem 254 couples to the connector body 231 via the second fastening member 268.

It will be noted that in the exemplary embodiment shown in FIG. 17a, the connector assembly 230 includes at least one mounting assembly 249, which facilitates interchangeability of component elements and other components that are associated with the connector assembly 230. Preferably, the at least one mounting assembly 249 comprises at least one NAMUR standard mounting assembly, so that standard components, such as a positioner, can be fastened to the connector assembly 230.

As will be seen, the present stem connector assembly has significant advantages over the various known stem connector apparatus. For example, the present invention eliminates the need to make the entire stem connector unit from one block of metal, and then saw it in half. It eliminates the need to make, store, ship and sell a stem connector assembly only in a "matched set" form. It further eliminates the need to use one or more fastening bolts to hold the two halves of a matched set together. Thus, because of the present stem connector assembly's overall design, it is both easy to manufacture and easy to assemble, resulting in significant cost and labor savings over known prior stem connectors. Then importantly, because of the presence of a through hole in the stein connector body, which is somewhat larger than the diameter of the associated threaded valve stem extending through it, the present stem connector assembly can permit some overall misalignment, and therefore be manufactured with somewhat "looser", i.e. less stringent, tolerances. Yet the present stem connector assembly still allows for proper and effective assembly and operation. This, in turn, permits reduced manufacturing costs for the overall assembly.

Another significant benefit of the present stem connector assembly is that the above-noted ability to withstand some misalignment of the actuator rod and valve stem acts to prevent excessive wear respectively on the actuator rod bushing, i.e. stem guide, and on the valve stem packing. That, in turn, provides longer valve life. Also, the present stem connector assembly can be easily made to conform to NAMUR and other standard mounting specifications.

In view of the above detailed description of the present invention and associated drawings, other modifications and variations will now become apparent to those skilled in the art. It should also be apparent that such other modifications and variations might be affected without departing from the spirit and scope of the present invention.

What is claimed is:

1. A stem connector operatively connecting an actuator rod to a valve stem, comprising:

a connector body having a frame portion, the connector body including an inner surface and an outer surface, the inner surface forming an inner chamber an the outer surface including a mounting opening formed to at least one standard mounting specification to permit mounting of a component element to the stem connector;

an actuator rod passageway extending from the outer surface through the frame portion into the inner chamber, the actuator rod passageway adapted to receive an actuator rod portion; and a valve stem passageway extending from the outer surface through the frame portion into the inner chamber, the valve stem passageway adapted to received a valve stem portion;

wherein the stem connector substantially eliminates lost motion between the actuator rod and the valve stem.

2. The apparatus of claim 1, wherein the connector body is a unitary component.

3. The apparatus of claim 1, wherein one of the actuator rod passageway and the valve stem passageway is tapped so as to threadedly receive the respective one of the actuator rod portion and the valve stem portion.

4. The apparatus of claim 3, and a locking member adapted to positionally retain the respective one of the actuator rod portion and the valve stem portion as threadedly received in the respective actuator rod passageway and valve stem passageway.

5. The apparatus of claim 1, and an actuator rod portion carrying at a proximate surface thereof an outwardly extending flange portion, and a locking unit adapted to retainably engage the flange portion and couple to the connector body.

6. The apparatus of claim 5, where at least part of the outer surface of the connector body is threaded, and the locking unit is end cap member threadedly secured to the threaded outer surface of the connector body.

7. The apparatus of claim 1, wherein the valve passageway is a throughbore to receive the valve portion, and a locking unit to retain the valve portion within the valve passageway.

8. The apparatus of claim 7, wherein the locking unit comprises at least one lock nut.

9. The apparatus of claim 1, wherein the connector body in cross section is one of a generally square, rectangular, hexagonal, octagonal, and cylindrical shape.

10. The apparatus of claim 1, and an actuator rod portion having a receiving chamber formed in the proximate end thereof to receive a distal end of a valve stem portion extending thereinto.

11. The apparatus of claim 1, wherein both the actuator passageway and the valve passageway of the connector body are tapped to threadedly receive the respective actuator rod member and valve portion.

12. The apparatus of claim 11, an locking units respectively securing the actuator rod member and valve portion to the connector body.

13. The apparatus of claim 12, wherein the locking units are lock nuts.

14. The apparatus of claim 6, and a locking unit adapted to retainably secure the position of the valve stem portion relative to the connector body.

15. The apparatus of claim 1, and an actuator rod member carrying adjacent the distal end thereof a locking ring member, and a locking unit adapted to retainably engage the locking ring member and couple to the connector body.

16. The apparatus of claim 15, wherein at least a portion of the outer surface of the connector body is threaded and the locking unit is an end cap member threadedly secured to the threaded outer surface of the connect body.

17. The apparatus of claim 15, wherein the locking ring member is one of a snap ring and a spiral spring ring.

18. The apparatus of claim 15, and a locking unit adapted to retainably secure the coupled position of the valve member relative to the connector body.

19. The apparatus of claim 1, wherein the component element is a positioner.

\* \* \* \* \*

UNITED STATES PATENT AND TRADEMARK OFFICE
CERTIFICATE OF CORRECTION

PATENT NO.        : 6,939,074 B2
APPLICATION NO.   : 10/357901
DATED             : September 6, 2005
INVENTOR(S)       : Gethmann Page 1 of 1

It is certified that error appears in the above-identified patent and that said Letters Patent is hereby corrected as shown below:

In the Specification:
At Column 2, lines 60-61 please delete "General Service" and insert "general service"

In the Claims:
In Claim 1, at Column 11, line 51, please delete "an" immediately after "chamber" and insert --and--
In Claim 1, at Column 11, line 61, please delete "received" and insert -- receive--
In Claim 12, at Column 12, line 38, please delete "an" and insert -- and--

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO.         : 6,939,074 B2                                        Page 1 of 1
APPLICATION NO.    : 10/357901
DATED              : September 6, 2005
INVENTOR(S)        : Gethmann It is certified that error appears in the above-identified patent and that said Letters Patent is hereby corrected as shown below:

In the Specification:
    At Column 2, lines 60-61 please delete "General Service" and insert --general service--

In the Claims:
    In Claim 1, at Column 11, line 51, please delete "an" immediately after "chamber" and insert -- and --
    In Claim 1, at Column 11, line 61, please delete "received" and insert -- receive--
    In Claim 12, at Column 12, line 38, please delete "an" and insert -- and--

Signed and Sealed this

Twentieth Day of February, 2007

JON W. DUDAS
*Director of the United States Patent and Trademark Office*